United States Patent
Camarota et al.

(10) Patent No.: US 10,621,132 B1
(45) Date of Patent: Apr. 14, 2020

(54) AUTO ADDRESS GENERATION FOR SWITCH NETWORK

(71) Applicant: Xilinx, Inc., San Jose, CA (US)

(72) Inventors: Rafael C. Camarota, San Jose, CA (US); Ian A. Swarbrick, Santa Clara, CA (US); Kin Yip Sit, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 94 days.

(21) Appl. No.: 15/588,321

(22) Filed: May 5, 2017

(51) Int. Cl.
*G06F 13/40* (2006.01)
*G06F 12/06* (2006.01)
*G06F 15/78* (2006.01)

(52) U.S. Cl.
CPC ........ *G06F 13/404* (2013.01); *G06F 12/0653* (2013.01); *G06F 13/4022* (2013.01); *G06F 15/7825* (2013.01); *G06F 2212/656* (2013.01); *G06F 2213/4004* (2013.01)

(58) Field of Classification Search
CPC .............. G06F 13/404; G06F 12/0653; G06F 13/4022; G06F 15/7825; G06F 2212/656; G06F 2213/4004
See application file for complete search history.

(56) References Cited

U.S. PATENT DOCUMENTS

| | | | |
|---|---|---|---|
| 7,010,664 B1 | 3/2006 | Burns et al. | |
| 7,328,286 B2* | 2/2008 | Vinnemann | H04L 12/403 710/113 |
| 8,145,877 B2 | 3/2012 | Jones et al. | |
| 8,219,782 B2 | 7/2012 | Stirling et al. | |
| 9,961,019 B2* | 5/2018 | Chen | H04L 49/109 |
| 2016/0205066 A1* | 7/2016 | Attarwala | H04L 12/40 709/208 |

* cited by examiner

*Primary Examiner* — Idriss N Alrobaye
*Assistant Examiner* — Richard B Franklin
(74) *Attorney, Agent, or Firm* — Patterson + Sheridan, LLP

(57) ABSTRACT

Embodiments herein describe techniques for assigning address ranges to ports in switches forming a packet protocol switch network in an integrated circuit. Instead of relying on a designer to provide the addresses, the integrated circuit can include an address bus which is incremented as addresses are assigned to the ports. In one embodiment, the port addresses are assigned from a root device and defines the address range of each branch port and the address of each endpoint in the network. As the address bus reaches an endpoint, an adder in the endpoint increments the value of the address bus (e.g., the current address). The address bus may use serial or parallel data communication to assign the addresses. In another embodiment, instead of using a separate address bus, a data bus typically used for packet communication assigns the addresses to the ports in the network.

20 Claims, 6 Drawing Sheets

| P1 ADDRESS RANGE | A:B-1 | 0:0 |
| P2 ADDRESS RANGE | A:C-1 | 1:0 |
| P3 ADDRESS RANGE | C:D-1 | 1:1 |
| P4 ADDRESS RANGE | D:E-1 | 2:5 |

# AUTO ADDRESS GENERATION FOR SWITCH NETWORK

TECHNICAL FIELD

Examples of the present disclosure generally relate to a network on a chip (NoC) and, in particular, to assigning addresses to endpoints in the NoC using an auto address generation bus.

BACKGROUND

Programmable integrated circuits (e.g., a field programmable gate array (FPGA), programmable logic device (PLD)) can contain a packet network structure known as a network on a chip (NoC) which is programmed using a network referred to herein as a NoC configuration network (NCN). The NCN includes multiple switches which route packets between configurable logic. To do so, the NCN assigns unique addresses to the ports coupled to the configuration memories. However, assigning addresses is time consuming. Moreover, the configuration of the NCN can change depending on the configuration of the programmable integrated circuit which means the addresses assigned to one NCN will not work in a programmable integrated circuit with a different construction.

SUMMARY

Techniques for assigning addresses to ports in switches in an integrated circuit are described. One example is an integrated circuit that includes a NoC, a start port, a first switch comprising a plurality of ports, and a first endpoint coupled to a first port of the plurality of ports, the first endpoint comprising a first adder. The integrated circuit also includes an address bus extending from the start port, through the first switch, and terminating at a termination port, wherein at least a first segment of the address bus couples the first port to the first endpoint. Moreover, the first switch is configured to assign an address range to the first port based on the first adder incrementing a value of the address bus according to a predefined address range value.

One example described herein is a method of assigning an address space in a integrated circuit comprising a NoC. The method includes determining a first value of an address bus received at a start port of a first switch, wherein the address bus extends from the start port, through the first switch, and terminating at a termination port. The method includes forwarding the first value of the address bus to a first port of the first switch, wherein the first port is coupled to a first endpoint, and wherein the first endpoint comprises a first adder that increments the first value of the address bus based on a predefined address range value. The method includes receiving, at the first switch, the incremented value of the address bus from the first endpoint and assigning an address range for the first port by comparing the first value of the address bus to the incremented value of the address bus.

One example described herein is an integrated circuit that includes a NoC, a root device, a switch comprising a plurality of ports, a plurality of endpoints coupled to the plurality of ports, and a data bus coupled to the root device, the switch, and the plurality of endpoints. Moreover, the integrated circuit is configured to transmit packets using the data bus to assign address ranges to the plurality of endpoints using a self-addressing technique.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
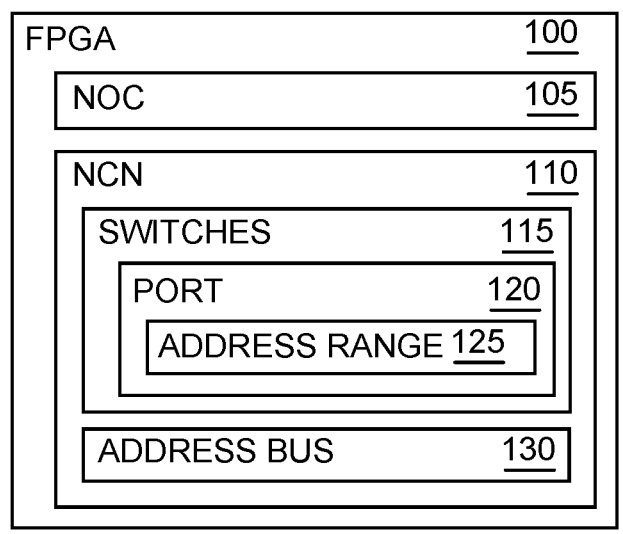
FIG. 1 is a block diagram of an FPGA containing a NoC and a NCN, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for assigning address ranges to ports of switches and endpoints in a NCN. That is, instead of relying on a designer to provide the addresses, the NCN can include an auto address generation bus (referred to herein as an "address bus") which is incremented as addresses are assigned to the ports of the NCN switches. In one embodiment, the address bus includes parallel data lines whose bit values represent the current address being assigned. The address bus is connected via a port in a switch to an endpoint or a different switch in the NCN. As the address bus reaches an endpoint, the NCN increments the value of the address bus (e.g., the current address). The ports coupled to the endpoints are assigned incremental addresses which can later be used to transmit packets to the endpoints using the NCN. Moreover, in one embodiment, the assigned addresses are not stored in registers but rather can be derived from the values of the different segments of the address bus coupled to the endpoints or to neighboring switches. Thus, this addressing scheme is more intolerant to a single event upset (SEU or soft errors) and NCN resets than schemes that store addresses in registers or latches.

In another embodiment, the address bus uses serial data communication to assign the addresses. Although this embodiment may use an address bus with fewer lines than a parallel address bus, the NCN may use a clock signal and store the assigned port address ranges into registers which reduces the SEU tolerance of the address scheme and may increase the amount of time required to assign the port addresses when the NCN is powered on. In another embodiment, instead of using a separate address bus, the NCN may leverage the data bus typically used for packet communication to assign the addresses to the ports of the NCN switches.

FIG. 1 is a block diagram of an FPGA 100 containing a NoC 105 and a NCN 110, according to an example. The NoC 105 is a communication subsystem that provides communication between various endpoints (e.g., hardware elements such as processors, memory, digital-to-analog converters, I/O ports, and the like) in the FPGA 100. In one embodiment, the NCN 110 is a switching network which programs the NoC 105. That is, the NCN 110 can alter the manner in which the NoC 105 provides communication between endpoints in the FPGA 100. To do so, the NCN 110 includes switches 115 that each include multiple ports 120. Although not shown in FIG. 1, the ports 120 can couple to configuration memories which store configuration information for configuring the NoC 105. That is, the data stored in the configuration memories by the NCN 110 determines the configuration of the switches of the NoC 105 and other elements connected to the NoC 105. These configuration memories are also referred to as endpoints.

Each port 120 is assigned an address range 125 which can be used to route packets to configuration memories or other NCN switches 115 coupled to the ports 120. For example, the switch 115 may include four ports 120 which each are assigned a unique address range 125 (the port coupled to the root node is not assigned an address since data is only received from this port). Using the address ranges 125, the NCN 110 can transmit packets to, or read data from, the configuration memories. Instead of a system designer assigning the address ranges 125 when designing the FPGA 100, in the embodiments herein, the NCN 110 includes an address bus 130 for assigning the address ranges 125 automatically, i.e., without human input. In one embodiment, the address bus 130 is separate from a data bus used to transmit the data packets between the configuration memories using the switches 115. For example, the data bus may include a hundred wires while the address bus includes only ten wires. In one embodiment, the address bus 130 is not used to transmit data packets between the switches 115 and the configuration memories.

In one embodiment, the address bus 130 relies on parallel data communication to assign the address ranges 125 to the ports 120. For example, the address bus 130 may include parallel wires where the voltages on the wires represent either a logical one or a logical zero—i.e., a data bit. A ten-wire address bus 130 can uniquely assign 2^10 addresses (1024 addresses). Of course, adding or reducing the number of addressable bits has a corresponding effect on the address space of the NCN 110. That is, increasing the width of the address bus 130 increases the total address space that can be assigned to the address ranges 125, and vice versa.

In another embodiment, the address bus 130 relies on serial data communication to assign the address ranges 125. In this example, the address bus 130 may have only one wire. Doing so may save space on the FPGA 100 since a serial address bus may include fewer wires than a parallel bus. However, assigning the addresses serially uses multiple communication cycles and a NCN that uses a serial bus may include more complex logic relative to a system that uses a parallel bus (although transistors are typically more plentiful than wires). Thus, when using serial communication, the NCN 110 may include a clock signal for transmitting the address ranges 125 between the switches 115 and the configuration memories or other switches 115. Further, the NCN 110 may include registers for storing the port address ranges 125 when using a serial address bus 130. In contrast, when using a parallel address bus 130, the addresses ranges 125 do not need to be stored in memory but instead can be identified by evaluating the values accumulated on different segments of the address bus 130. That is, a port may be coupled to each configuration memory (or another switch 115) by two segments of the address bus 130—i.e., an egress bus segment and an ingress bus segment. By comparing the different values accumulated on these segments, the switch 115 can determine the address range for the corresponding port. As such, a parallel address bus 130 may be more intolerant to a SEU or a soft error caused by radiation flipping a bit value.

Although the embodiments herein describe using the NCN 110 for configuring a programmable NoC 105 in the FPGA 100, the embodiments are not limited to such and can be used in any programmable IC. Further still, In other embodiments, the auto-address generation techniques below can be used to assign addresses to endpoints in a NoC 105 on a non-programmable IC such as an ASIC. A NoC 105 on a non-programmable IC may include switches that are not programmable such the network configuration of the NoC 105 cannot be changed (e.g., the switches in the NoC remain coupled to the same switches and endpoints as when the IC was fabricated). In one embodiment, a non-programmable IC does not include a NCN since the configuration of the NoC 105 in the IC cannot be changed. In that case, instead of using the switches in the NCN 110, the auto-address generation schemes below can use the switches in the NoC 105 to auto-assign address ranges to the ports of the NoC switches. Although the NCN 110 is shown as being separate from the NoC 105, in one embodiment, the NCN 110 can be considered part of the NoC 105.

Figures 2, 3:
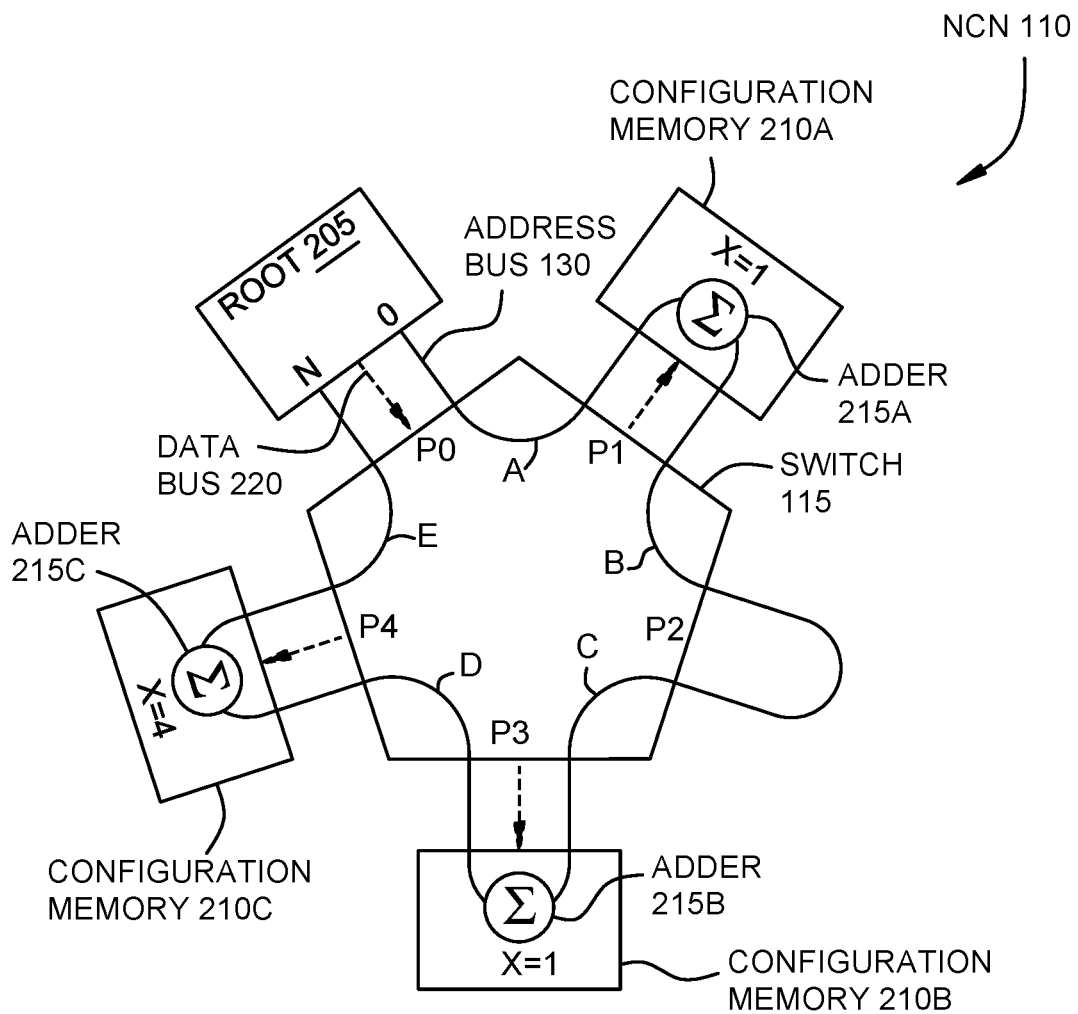
FIG. 2 illustrates a NCN that assigns addresses using a parallel address bus, according to an example.
FIG. 3 is a chart of port address ranges assigned to a NCN switch in FIG. 2, according to an example.

FIG. 2 illustrates a NCN 110 that assigns addresses using a parallel address bus, according to an example. As shown, the NCN 110 includes a root device 205 which has a start port (labeled "0") which is the starting point for the address bus 130 and a termination port (labeled "N") which is the termination point of the address bus 130. The root device 205 may include driver circuitry to drive a beginning segment of the address bus 130—i.e., a segment connecting the root device 205 to the switch 115. In this example, the start port of the address bus 130 outputs a value of zero for the address bus 130.

In addition to the address bus 130, a data bus 220 also couples the root device 205 to the switch 115. Using the data bus 220, the root device 205 can transmit data packets to the switch 115 which forwards these packets to configuration memories 210 or to other NCN switches (not shown in FIG. 2) based on the address ranges assigned to the ports P1-P4. The switch 115 includes logic for routing the data packets to any number of configuration memories 210. To do so, the ports labeled P1-P4 use different data bus segments as shown by the dotted arrows. As mentioned above, the ports P1-P4 are assigned unique addresses or address ranges in order to route the packets to the intended destination, i.e., the intended configuration memory 210.

To assign addresses to the ports and the configuration memory 210, the address bus 130 is routed through the switch 115 to each of its ports P1-P4. In this embodiment, the address bus 130 includes respective segments (i.e., an egress segment and an ingress segment) that connect the ports of the switch 115 to configuration memories 210. The bus address segments extend from Nodes A-E in the switch 115 to the configuration memory. As used herein, a "node"

is a sample point on the address bus 130 that is used to set the address range of a corresponding port (e.g., P1-P4) in the switch 115. The egress segment of the address bus 130 for port P1 extends from Node A in switch 115 to configuration memory 210A while the ingress segment of the bus 130 for port P1 extends from the configuration memory 210A to Node B in the switch 115. However, each port does not need to couple to a configuration memory 210. In this example, port P2 is not coupled to a configuration memory 210 and thus the address bus 130 at port P2 is a short circuit between Node B and Node C in the switch 115.

In one embodiment, at startup, the root device 205 drives voltages on the address bus 130 that correspond to an initial address value—e.g., zero. These voltages are then forwarded by the switch 115 to the configuration memory 210A, and more specifically, to an adder 215A in the configuration memory 210A. The adder 215A increments the value on the address bus according to a predefined address range value "X". For example, the size of the memory in the configuration memories 210 may vary, and thus, the address range assigned to the ports of the switch 115 coupled to these memories 210 can vary accordingly. In FIG. 2, the configuration memories 210A and 210B have address range values of 1 while the configuration memory 210C has an address range value of 4 indicating that the address range assigned to the configuration memory 210C should be four times larger than the address ranges assigned to the configuration memories 210A and 210B. In one embodiment, the address range represents blocks of memory. For example, an address value of one can represent a single memory block of 64 KB while a value of four represents four blocks of 64 KB of memory.

The adder 215A increases the value on the address bus 130 which is then driven on the segment of the bus 130 coupled to Node B of the switch 115. In turn, the switch 115 can identify the address range for port P1 (and the configuration memory 210A) by comparing the value of the address bus segments 130 at Node A and at Node B. In this embodiment, the adder 215A increases the value of the address bus 130 from zero to one.

FIG. 3 is a chart 300 of port address ranges assigned to the NCN switch 115 in FIG. 2, according to an example. As shown, the chart illustrates the address range for the ports P1-P4 that were derived using the values of the address bus 130 at the Nodes A-E in the switch 115. The address range for port P1 and configuration memory 210A is A:B−1. Because at Nodes A and B the values of the address bus 130 are zero and one, respectively, the address range for port P1 is 0:0. This indicates that any NoC packets transmitted with an address of zero are intended for the configuration memory 210.

Returning to FIG. 2, in one embodiment, the switch 115 includes circuitry for determining the values represented by the voltages at the Nodes A-E. Based on these values, the switch 115 can determine the address range as shown in chart 300. One advantage of using the values on the address bus 130 to derive the address ranges is that the NCN 110 is more tolerant to a SEU than storing the address ranges in registers. That is, the address range for any configuration memory 210 can be determined by evaluating the value of the bus 130 at the nodes coupled to the configuration memory 210 without storing the address range in a register. Thus, even if a SEU changes the voltage on one of the wires of the bus 130 thereby changing the value of the bus 130, the NCN 110 is self-correcting in that the adder 215 or root device 205 drives that segment of the bus 130 to the correct value. For example, if a SEU changes the value of the bus 130 at Node B to a two instead of a one, the adder 215A (whose output is dependent on the input received from Node A and the address range value) outputs the correct voltages so the value of the address bus 130 changes back to a one. In this manner, the NCN 110 can correct any errors in the segments of the address bus 130 caused by a SEU or soft errors. Therefore, in one embodiment, the addresses are not stored in memory elements (e.g., registers or RAM) but instead derived from the voltage values on the parallel address bus 130. So long as the address bus 130 remains powered, the switch 115 can use the voltages on the different segments of the address bus 130 to identify the address ranges of its ports. Thus, when packets are received from the root device 205, the switch can compare the port addresses to a destination address in the packet to identify to destination port on which the packet should be forwarded.

Because no configuration memory is coupled to port P2 of the switch 115, the address bus 130 is short circuited between Node B and Node C. As a result, the value of the address bus at Nodes B and C is the same value—i.e., one in this example. Thus, as shown in chart 300, the address range for port P2 is 1:0 (i.e., B:C−1). Because the left value is greater than the right value for this address range, no valid address is assigned to port P2. Put differently, no packets will be routed to port P2 in the NoC—there is no address that is greater than or equal to 1 and less than or equal to 0.

After Node C, the switch 115 routes the address bus 130 to configuration memory 210B which contains an adder 215B which increments the value of the address bus 130 by a value of one as indicated by the address range value X. Thus, the value of the segment of the address bus 130 between the configuration memory 210B and the Node D is two. As shown in chart 300, the calculation of C:D−1 yields an address range for port P3 as 1:1. Thus, any packets transmitted on the data bus 220 with an address of one are forwarded by the switch 115 to port P3 and to the configuration memory 210B.

After Node D, the switch 115 routes the address bus 130 to configuration memory 210C which contains an adder 215C which increments the value of the address bus 130 by a value of four as indicated by the address range value X. Thus, the value of the address bus 130 is two at Node D but is six at Node E. As shown in chart 300, the calculation of D:E−1 yields an address range for port P4 of 2:5. Thus, any packets with an address of two, three, four, and five are forwarded by the switch 115 to port P4 and to the configuration memory 210C.

The address bus 130 terminates at the termination port of the root device 205. In one embodiment, the address bus 130 always begins and ends at the root device 205. Further, the root device 205 can compare the value of the address bus 130 at the start port and at the termination port to determine if the requisite number of addresses has been assigned. For example, the system designer may store in the root device 205 the total number of addresses to be assigned which can be used as a checksum to determine if all the addresses have been assigned. If the value of the address bus 130 at the termination port—i.e., "N"—does not match the expected value, the root device 205 can identify that some of the configuration memories 210 have not yet been assigned an address or that there is a malfunction in the NCN 110—e.g., one of the adders 215 or the switch 115 is not performing properly. For example, during start-up, the NoC may wait to transmit data packets to the configuration memories 210 until the value of the address bus 130 at the termination port of the root device 205 indicates all the address have been assigned.

In one embodiment, to test the auto-address generation functionality in the NCN 110, the root device 205 increments the starting address at the start port which should result in all the address ranges also being incremented. The root device 205 determines if the value of the address bus 130 at the termination port is incremented by the same value. That is, if instead of starting the addresses at zero, the root device 205 can output a two at the start port and determine if the value of the address bus 130 at the termination port also increments by two—i.e., N+2—which serves as a technique for testing the operation of the auto-address generation functionality of the NCN 110.

In one embodiment, each switch 115 in the NCN 110 includes a path back to the root device 205. Thus, the assigned address can be summed on the various nodes of the address bus 130 as the bus 130 snakes around the switches 115 in the NCN 110. The root device 205 determines whether the summed total of the assigned addresses matches "N" which represents the total number of addresses that should be assigned to the configuration memories 210.

One advantage of the NCN 110 in FIG. 2 is that the assigned addresses are not affected or deleted when the NCN 110 is reset. When resetting an NCN, the register values in the NCN 110 which store the address ranges would be erased. However, because the switches 115 can derive the addresses from the voltages on the various nodes of the address bus 130 rather than storing the address in memory, the configuration memories 210 are addressable even during a NCN reset. Moreover, the NCN 110 can begin to assign address ranges using the address bus 130 before power rails in the FPGA have stabilized or a NCN clock signal is operational.

Figure 4:
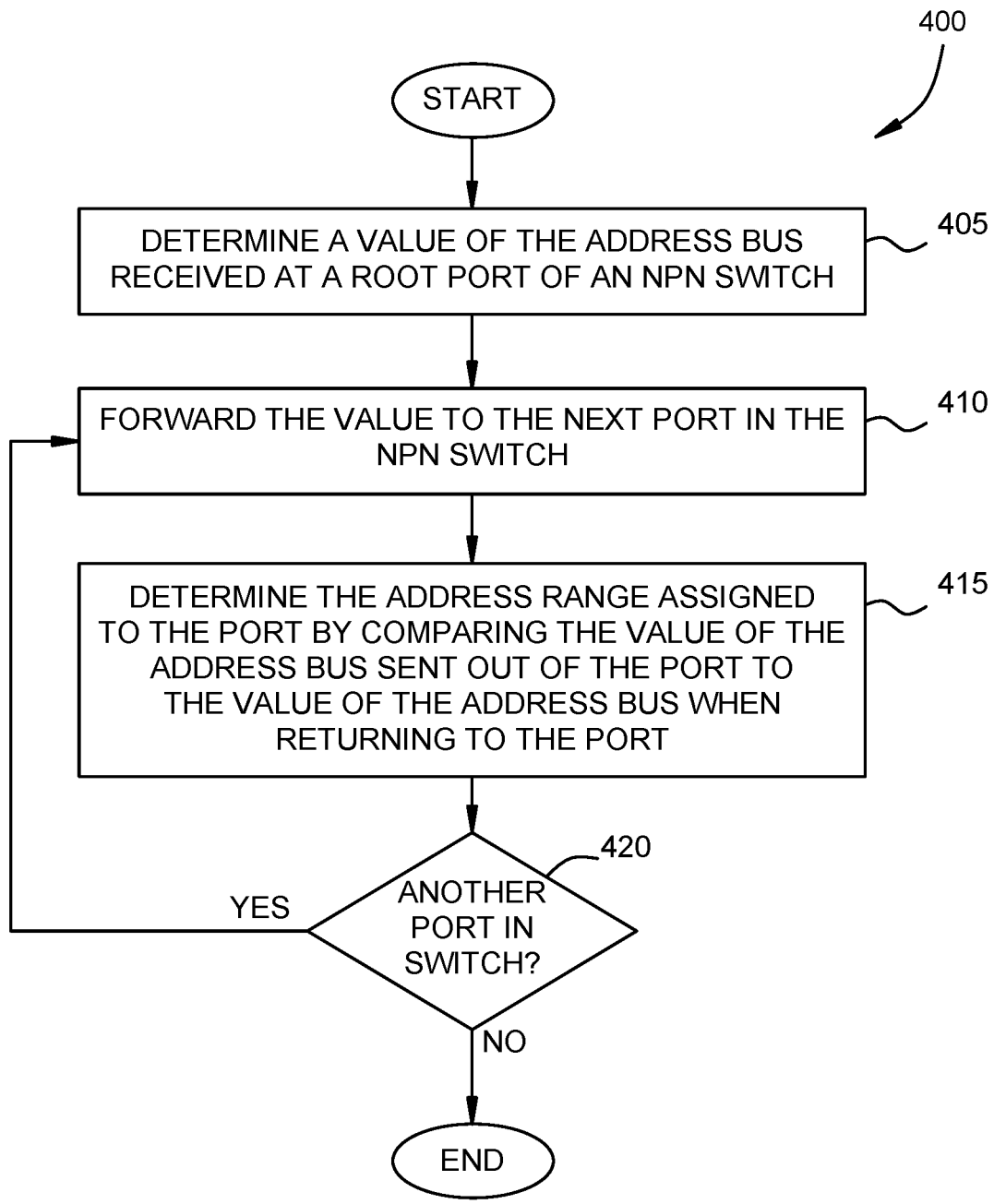
FIG. 4 is flowchart for assigning ranges to endpoints in a NCN, according to an example.

FIG. 4 is flowchart of a method 400 for assigning ranges to endpoints in a NCN, according to an example. The method 400 begins at block 405 where a NCN switch determines the value of the address bus received at a root port in the NCN switch. In one embodiment, the root port is coupled to the root device 205 as shown by port P0 in FIG. 2. There, the switch 115 determines that the value of the address bus 130 is zero.

Figure 5:
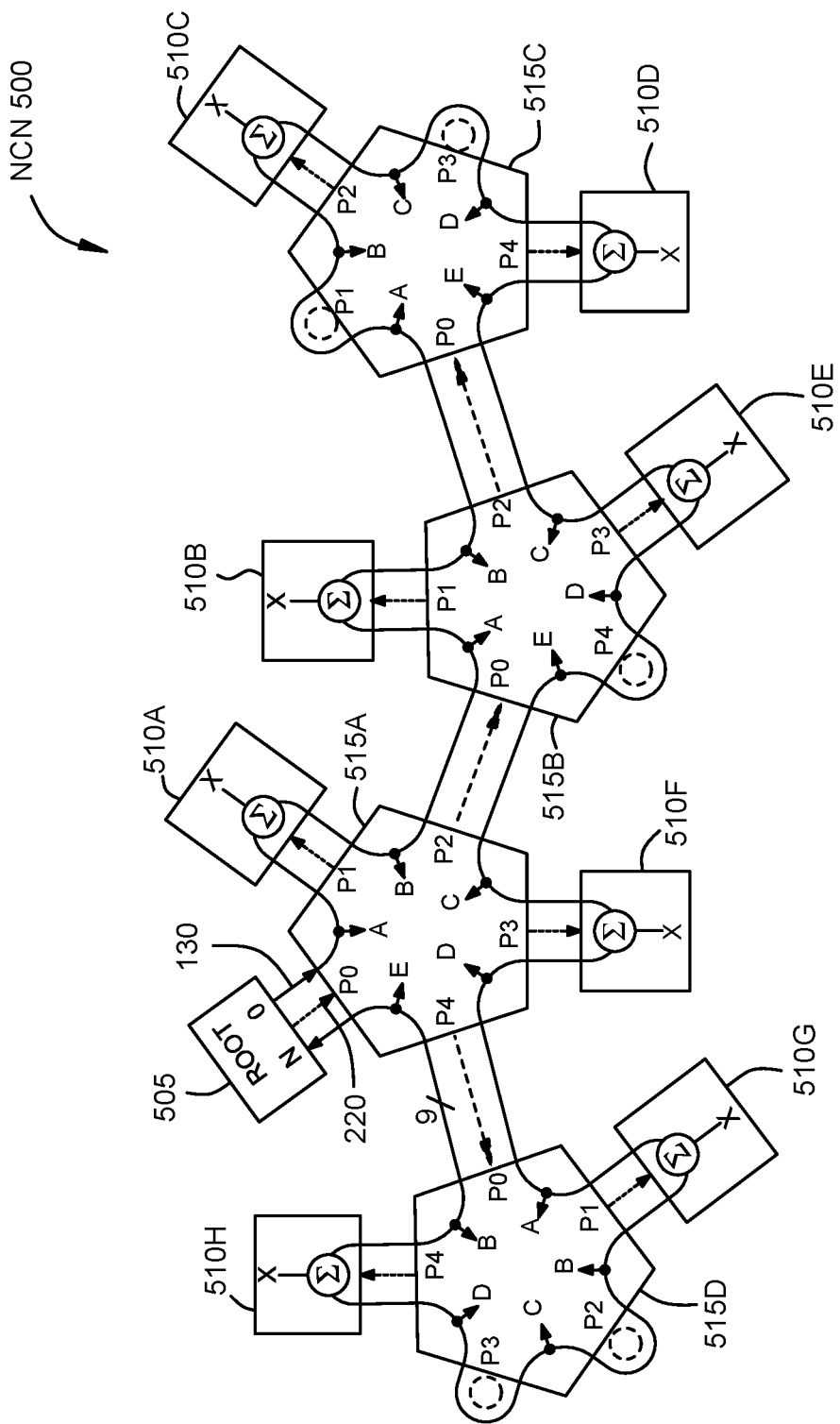
FIG. 5 illustrates a NCN, according to an example.

In another embodiment, the root port is coupled to another switch in the NCN. FIG. 5 illustrates a NCN 500 with a plurality of switches 515, according to an example. As shown, only switch 515A has a root port P0 with a direct connection to a root device 505. Moreover, instead of being coupled only to configuration memories 510, the switches 515 are coupled to other switches 515. For example, port P2 of switch 515A is coupled to root port P0 of switch 515B while port P4 of switch 515A is coupled to root port P0 of switch 515D. Further, port P2 of switch 515B is coupled to root port P0 of the switch 515C. In one embodiment, data is only received at, and not transmitted from, the root ports P0, and thus, these ports do not need to be assigned address ranges.

In FIG. 5, the address bus 130 extends through all the switches 515 and their respective ports to assign addresses to the configuration memories 510. If a port is coupled to another switch 515, the address range for that port includes the cumulative total of address ranges of all the ports and configuration memories 510. For example, the address range for port P2 of switch 515A includes all the address ranges assigned to the ports in the switches 515B and 515C. Assuming each configuration memory 510 in FIG. 5 contain one block of memory, port P1 is assigned the first address value (e.g., address range 0:0) but port P2 of the switch 515A is assigned an address range that includes the address ranges of the four ports coupled to the configuration memories 510B, 510C, 510D, and 510E. If the ports coupled to the configuration memories 510B, 510C, 510D, and 510E are assigned address ranges 1:1, 2:2, 3:3, and 4:4, respectively, the address range for P2 of the switch 515A is 1:4. Thus, whenever the switch 515A receives a packet with an address within the range 1:4, the switch 515A forwards the packet using port P2 to the root port P0 in switch 515B. Similarly, the port P2 of switch 515B is assigned an address range that includes the ranges of the ports P2 and P4 coupled to the configuration memories 510C and 510D in the switch 515C—e.g., the address range 2:3. In this manner, the NCN 500 can include multiple switches 515 which are communicatively coupled to the address bus 130. Further, each of the switches 515 includes a return path to the root device 505 such that the address bus 130 both begins and terminates at the root device 505.

Returning to the method 400, at block 410, the switch forwards the value of the address bus to the next port in the NCN switch. Using the switch 515A in FIG. 5 as an example, after receiving the value of the address bus 130 from the root device 505 at Node A, that value is forwarded to the configuration memory 510A using the egress segment of the address bus extending between Node A and the configuration memory 510A. If the port is coupled to a different switch (e.g., like with port P2), the value of the address bus is transmitted to the neighboring switches—i.e., the switches 515B and 515C. The adders in the configuration memories 510 change the value of the address bus 130 such that when the address bus returns to port P2 of switch 515A, the value of the bus 130 has increased according to the number of the configuration memories 510 and the predefined address range values assigned to the ports coupled to those memories 510.

At block 415, the switch determines the address range assigned to the port by comparing the value of the egress address bus segment sent out of the port to the value of the ingress address bus segment returning to the port. As shown in chart 300 in FIG. 3, the port address range is determined by comparing the egress and ingress segments of the address bus 130 at the port. If the port is coupled to a configuration memory (or more generically, to an endpoint), the address range is determined by the adder in the configuration memory. If, however, the port is coupled to another switch, the address range for the port is determined by the adders in all the endpoints in the branch. Thus, in order to determine the address range for a port coupled to another switch, the NCN waits until all the configuration memories in the branch have updated the value of the address bus. Once the voltage has stabilized (i.e., each of the adders has increased the value on its respective segment of the address bus), the address range of the port can be determined as shown in chart 300. Again assuming each configuration memory increments the address by one, the port P2 of switch 515A has an address range of 1:4, the port P2 of the switch 515B has an address range of 2:3 and the port P4 on the switch 515A has an address range of 6:7 which include the address ranges of all configuration memories 510 in their respective branches.

At block 420, if there is another port in the switch, the method 400 returns to block 410 where the value of the address bus is sent out on the port to determine its address range which depends on whether an endpoint is coupled to the port or if the port is coupled to another NCN switch. However, if all the ports on the switch (and any connected switches and endpoints coupled to those ports) have been assigned addresses using the address bus, the method 400 ends.

Figure 6:
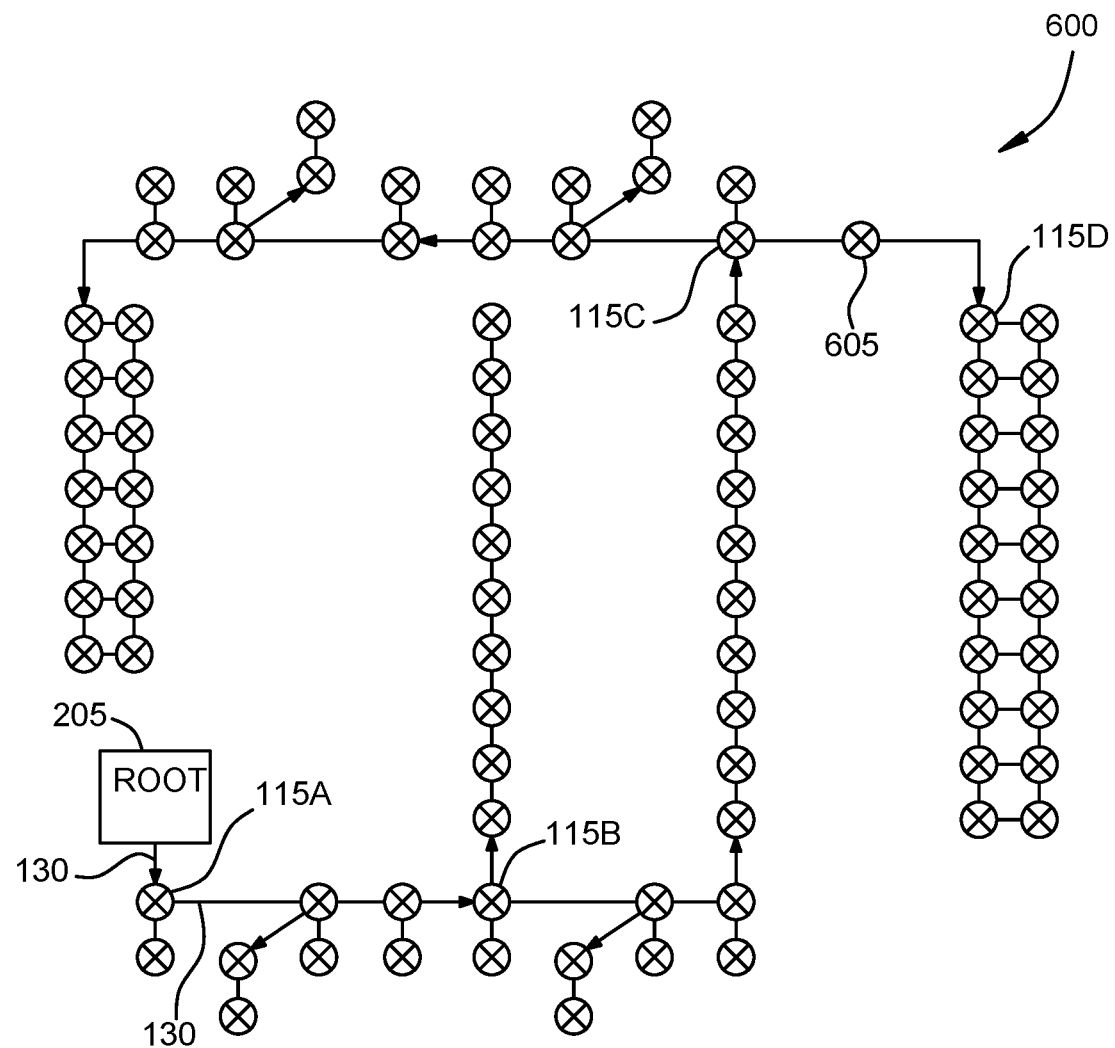
FIG. 6 illustrates a NCN, according to an example.

FIG. 6 illustrates a NCN 600, according to an example. For clarity, FIG. 6 only illustrates the individual switches 115 and the address bus 130 at a high level. For instance, FIG. 6 does not show the address bus 130 extending to configuration memories or unused ports in the switches 115. Moreover, FIG. 6 does not illustrate that the address bus 130 begins and terminates at the root device 205. That is, the address bus 130 first extends to switch 115A, traverses through all the other switches 115 in FIG. 6, and returns to switch 115A before terminating at the root device 205.

FIG. 6 illustrates that the NCN 600 can include switches in any number of configurations as well as illustrating multiple branches from the switches. For example, the switch 115b includes one branch that includes ten switches, a second branch that includes one switch, and a third branch that includes 64 switches. On the other hand, the switch 115C has one branch that includes 21 switches coupled to its right port, a second branch with one switch coupled to its upper port, and a third branch with 28 switches coupled to its left port. Moreover, the NCN 600 includes a buffer switch 605 which is placed in the switching network for electrical reasons. For example, the distance between the switch 115C and the switch 115D in the FPGA may be too great to reliable transfer voltages on the NCN data bus and the address bus 130. In response, the system designer can place the buffer switch 605 along the NCN data bus and the address bus 130 so that the circuitry in the switch 605 amplifies the voltages on the data bus and the address bus 130 so that the voltages are reliably received at the switch 115D. That same buffering can occur when the data bus and the address bus 130 return to the switch 115C from the switch 115D. The number of buffer switches 605 in a NCN can depend on the distances between the switches and configuration memories, and the distance voltages can be reliably driven on the address bus 130. The buffer switch would not consume any address space as it would not have any endpoints.

Figure 7:
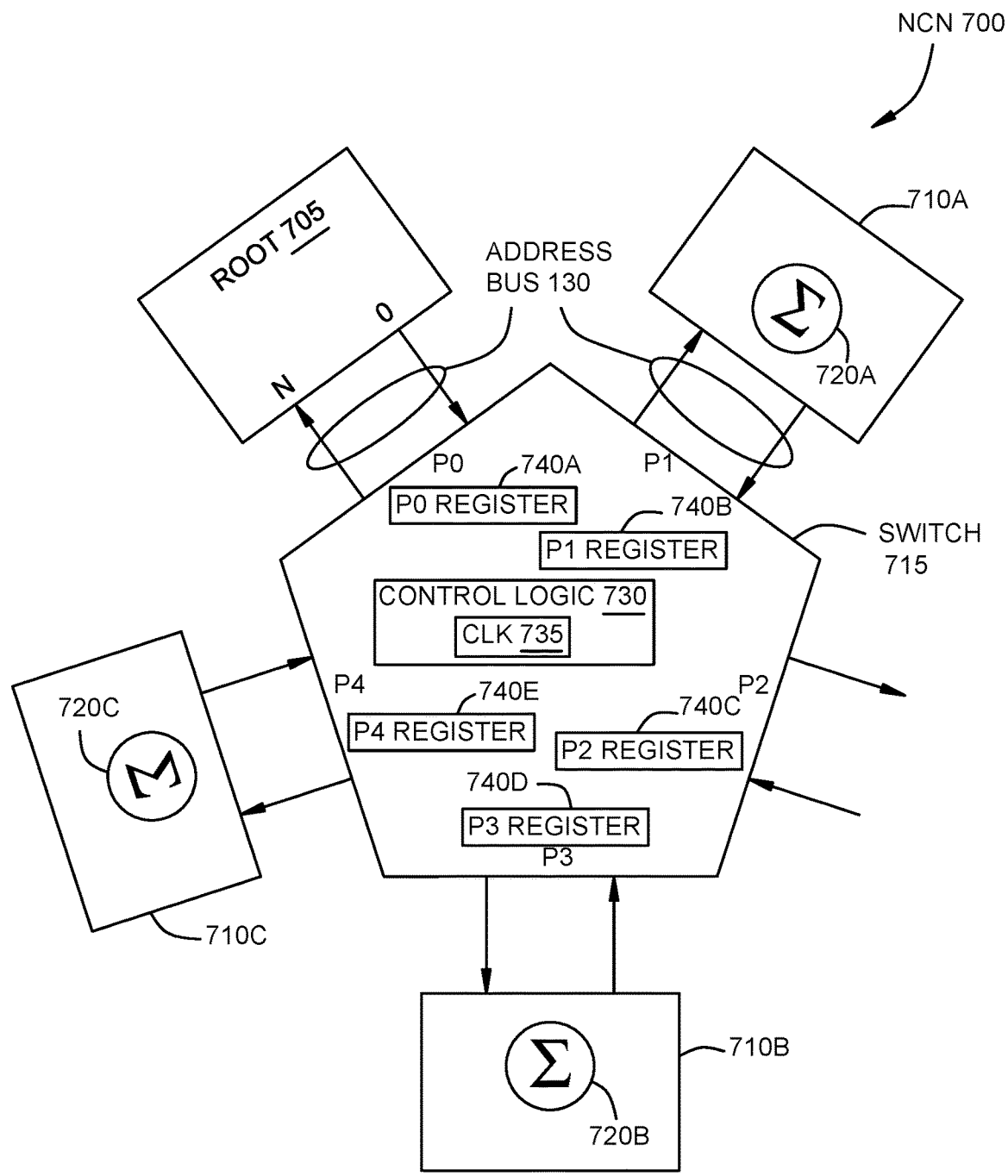
FIG. 7 illustrates a NCN that assigns addresses using a serial address bus, according to an example.

FIG. 7 illustrates a NCN 700 that assigns address ranges using a serial address bus 130, according to an example. That is, instead of a parallel address bus as discussed above, the address bus 130 may use serial data communication to assign the addresses. In this embodiment, the NCN 700 includes digital driver circuitry at each segment of the address bus for driving digital data between the hardware devices—e.g., between a root device 705 and a switch 715, between the switch 715 and a configuration memory 710 (i.e., an endpoint), or between the switch 715 and another switch.

The switch 715 includes control logic 730 for transmitting and receiving digital signals from the root device 705 and configuration memories 710. The control logic 730 (as well as the root device 705 and configuration memories 710) includes a clock signal 735 for timing the digital signals. For example, during each rising and falling edge of the clock signal 735, the control logic 730 can receive or transmit a digital bit using one of the segments of the address bus 130. When receiving the initial value of the address bus 130 from the root 705, the switch 715 may receive a digital bit during each edge of the clock signal 735. Assuming the NCN 700 has an address space of 1024, the root device 705 would transmit serially a 10-bit value indicating the initial value of the address bus 130. The control logic 730 then transmits that 10-bit value to the configuration memory 710A. Once received, the configuration memory 710A uses an adder 720A to digitally increment the value of the address bus 130 according to the predefined address range value "X".

The configuration memory 710A uses serial data communication to forward the incremented address bus value to the switch 715. The control logic 730 can compare the value of the address bus transmitted to the configuration memory 710A to the incremented value received from the memory 710A to determine the address range of the port coupled to the configuration memory 710A as shown in chart 300.

Unlike when using a parallel address bus, however, the switch 715 may be unable to determine the address range for its ports directly from the voltages stored on the address bus 130. That is, because the data is transmitted serially, at any given time, the voltage of the address bus 130 may indicate only one bit of data. Thus, the switch 715 includes registers 740 for storing the address range corresponding to the ports P1-P4. In FIG. 7, the switch 715 includes a register 740 for storing a value received at each port. For example, the P0 register 740A stores the value received on the root port P0 from the root device 705, the P1 register 740B stores the value received at port P1 from the configuration memory 710A, and so forth. The switch 715 can determine the address range for a port by subtracting the value stored in the register corresponding to the port from the register corresponding to the previous port. For example, to determine the address range for port P1, the switch 715 subtracts the value stored in the P1 register 740B from the value stored in the P0 register 740A.

Because the port P2 is not coupled to a configuration memory or another switch, the control logic 730 does not increase the value of the address bus received from the configuration memory 710A. The control logic 730 then stores the same value in the P2 register 740C which was stored in the P1 register 740B and transmits the same address bus value received from the configuration memory 710A to the configuration memory 710B. An adder 720B in memory 710B increments the address bus value which is then returned to the switch 715 using serial communication which is stored in register 740C. This process can continue until the registers 740 store the accumulated values derived by the adders 720 in the endpoints.

In one embodiment, the registers 740 may be shift registers. Assuming an 8 bit address range, each endpoint has an 8 bit shift register that would add X to the 8 bit value every eighth clock cycle. This would result in the 8 bit shift register segments being chained together. So if the root device 705 outputs zeros in multiples of eight after some number of clock cycles (e.g., N×8 where "N" is the number of nodes plus endpoints in the NCN), the 8 bit value at the root device 705 will be the desired address. More so, the 8 bit segment at the root device 705 will increment from 0 to the expected value and then stay at expected value for an infinite number of eight clock cycles.

Although not shown in FIG. 7, the switch 715 may be coupled at port P2 to one or more branch switches. As such, the control logic 730 waits until all the ports coupled to configuration memories or other switches are assigned address ranges. As above, the address range stored in register 740B for the port P2 can encompass all the address ranges assigned to the ports coupled to configuration memories in the branch.

One advantage of using a serial address bus 130 rather than a parallel address bus is that the different segments of the serial address bus may require fewer wires. For example, for a 10-bit parallel address bus, the NCN may include 10 wires in an egress segment extending from each port of the switch to a configuration memory or another switch as well as 10 wires in an ingress segment returning from the configuration memory or switch. With the serial address bus 130 in FIG. 7, only one wire may extend between the switch 715 and the configuration memories 710 since only one bit is transmitted or received at any given time. Thus, the NCN 700 may require less routing space for the address bus 130 than the address bus 130 in the NCN 110 shown in FIG. 2. However, as mentioned above, the switch 715 includes registers 740 that store the address range for the ports. That is, the address range is not derived directly from the voltages currently driven on the address bus but instead are derived from the registers 740. However, the memory elements forming the registers (e.g., latches or flip flops) are susceptible to a SEU which can cause the registers 740 to store inaccurate address data. If the address data stored in the registers 740 is accurate, the switch 715 may forward packets to the wrong configuration memory, or drop the packets. Further, if there is a NCN reset, the values in the registers 740 may be deleted which means the addresses have to be reassigned.

Unlike when a parallel address bus is used, the NCN 700 may not be self-correcting when inaccurate data is stored in the registers 740. Thus, the registers 740 may require error correction bits for identifying when a register is subjected to a SEU event which the control logic 730 can use to identify and correct the address values. However, this adds complexity to the hardware and may require the control logic 730 to, at intervals, check each of the registers 740 to ensure the stored address ranges have not been corrupted.

Further, transmitting data serially requires multiple clock cycles to transmit and receive the address values. However, with a parallel address bus, all the bits of transmitted in parallel. As such, a NCN that uses a parallel address bus may assign the addresses to the ports faster than a NCN that uses the serial address bus 130 in FIG. 7. In addition, serial communication may use a clock signal to synchronize the receivers and transmitters. In that embodiment, the NCN 700 waits until the NCN clock signal is operating before transmitting the address values on the address bus 130. Moreover, the NCN 700 may wait until the power rails in the FPGA are stable before transmitting data serially on the address bus 130. These delays may also result in a parallel address bus (which does may not use a clock signal and does not need stable power rails) assigning the address ranges faster than a serial address bus.

In another embodiment, the NCN may use the data bus to assign the addresses rather than using a separate address bus as described in FIGS. 2-7. In this example, the NCN can use a packet protocol that performs self-addressing. However, assuming a 9-bit address space (512 unique addresses), performing self addressing using the data bus may require up to 2*512 ! (factorial) clock cycles which can be longer than using a separate parallel or serial address bus as described above. Further, the NCN may wait until the power is stable and a clock signal is available before the data bus can be used to assign the addresses. Also additional commands may be required in the NCN packet protocol which can increase the complexity of the NCN switches.

One advantage of using the data bus is that additional wires for the address bus are not needed which can save space in the FPGA. However, like in FIG. 7, a NCN that uses the data bus to perform a self-addressing technique may include registers for storing the addresses which may increase the SEU susceptibility of the addressing system as well as repeating the self-addressing technique after a NCN reset.

While the foregoing is directed to specific examples, other and further examples may be devised without departing from the basic scope thereof, and the scope thereof is determined by the claims that follow.

What is claimed is:

1. An integrated circuit, comprising:
    a network on a chip (NoC); and
    a start port;
    a first switch comprising a plurality of ports;
    a first endpoint coupled to a first port of the plurality of ports, the first endpoint comprising a first adder; and
    an address bus extending from the start port, through the first switch, and terminating at a termination port, wherein at least a first segment of the address bus couples the first port to the first endpoint, and
    wherein the first switch is configured to assign an address range to the first port based on the first adder incrementing a value of the address bus according to a predefined address range value.

2. The integrated circuit of claim 1, further comprising:
    a second endpoint coupled to a second port of the plurality of ports, wherein the second endpoint comprises a second adder and wherein at least a second segment of the address bus couples the second port to the second endpoint,
    wherein the first switch assigns an address range to the second port based on the second adder incrementing the value of the address bus generated by the first adder.

3. The integrated circuit of claim 1, further comprising:
    a second switch coupled to a second port of the plurality of ports via a second segment of the address bus;
    a plurality of endpoints coupled to respective ports of the second switch via respective segments of the address bus, each of the plurality of endpoints comprises a respective adder for incrementing the value of the address bus,
    wherein the first switch assigns an address range to the second port that is based on a cumulative total of address ranges assigned to the ports of the second switch that are coupled to the plurality of endpoints.

4. The integrated circuit of claim 1, wherein a root device is configured to:
    compare a first value of the address bus at the start port to a second value of the address bus at the termination port to determine a total assigned address space; and
    upon determining that the total assigned address space does not match a predefined expected address space, determining that an address space has not been properly configured.

5. The integrated circuit of claim 1, further comprising:
    a NoC configuration network (NCN) for configuring the NoC, wherein the NCN comprises the first switch, the first endpoint, and the address bus, wherein the NCN further comprises:
        a data bus coupled to the first switch and the first endpoint, wherein the NCN is configured to transmit data packets to the first endpoint using the address range assigned to the first port, wherein the data bus is separate from the address bus.

6. The integrated circuit of claim 5, wherein the integrated circuit is a programmable integrated circuit and the NoC is a programmable NoC that is configured using the NCN, wherein the data packets, when stored in the first endpoint, configure at least one switch in the NoC.

7. The integrated circuit of claim 1, wherein the integrated circuit is a non-programmable integrated circuit and the NoC is a non-programmable NoC.

8. The integrated circuit of claim 1, wherein the address bus comprises parallel wires for transmitting data in parallel between the start port, the first switch, the first endpoint, and the termination port, and
    wherein the value of the address bus is set by voltages simultaneously driven on the parallel wires representing respective bits of the value of the address bus.

9. The integrated circuit of claim 8, wherein the first switch is configured to determine the address range for the first port by:
    comparing a first value of the address bus transmitted to the first endpoint using the first segment of the address bus to the incremented value generated by the first adder provided to the first switch using a second segment of the address bus,
    wherein the address range is not saved in any memory element in the first switch.

10. The integrated circuit of claim 1, wherein the address bus comprises wires for transmitting data serially between the start port, the switch, the first endpoint, and the termination port, and
    wherein the value of the address bus is determined based on bits transmitted serially on the address bus using a clock.

11. The integrated circuit of claim 10, wherein the first switch is configured to determine the address range for the first port by:
    comparing a first value of the address bus transmitted to the first endpoint using the address bus to the incremented value generated by the first adder and returned to the first switch using the address bus,
    wherein the first value and the incremented value are stored in respective registers in the first switch.

12. A method of assigning an address space in an integrated circuit comprising a NoC, the method comprising:
    determining a first value of an address bus received at a start port of a first switch, wherein the address bus extends from the start port, through the first switch, and terminating at a termination port;
    forwarding the first value of the address bus to a first port of the first switch, wherein the first port is coupled to a first endpoint, and wherein the first endpoint comprises a first adder that increments the first value of the address bus based on a predefined address range value;
    receiving, at the first switch, the incremented value of the address bus from the first endpoint; and
    assigning an address range for the first port by comparing the first value of the address bus to the incremented value of the address bus.

13. The method of claim 12, further comprising:
    forwarding the incremented value of the address bus to a second endpoint coupled to a second port of the first switch, wherein the second endpoint comprises a second adder that increments the incremented value of the address bus;
    receiving, at the first switch, a second value of the address bus generated by the second adder; and
    assigning an address range for the second port by comparing the incremented value of the address bus to the second value of the address bus.

14. The method of claim 12, further comprising:
    forwarding the incremented value of the address bus to a second switch coupled to a second port of the first switch, wherein a plurality of endpoints are coupled to respective ports of the second switch via respective segments of the address bus, each of the plurality of endpoints comprises a respective adder that increments the incremented value of the address bus;
    receiving, at the second switch, a second value of the address generated by the respective adders in the plurality of endpoints; and
    assigning an address range to the second port of the first switch that is based on a cumulative total of address ranges assigned to ports of the second switch that are coupled to the plurality of endpoints.

15. The method of claim 12, further comprising:
    comparing a second value of the address bus at the start port to a third value of the address bus at the termination port to determine a total assigned address space; and
    upon determining that the total assigned address space does not match a predefined expected address space, determining that an address space has not been properly configured.

16. The method of claim 12, wherein the integrated circuit is a programmable integrated circuit and comprises a NCN for configuring the NoC, wherein the NCN comprises the first switch, the first endpoint, and the address bus, wherein the NCN further comprises a data bus, and wherein the method further comprises:
    transmitting data packets on the data bus to the first endpoint using the address range assigned to the first port, wherein the data bus is separate from the address bus, and wherein data bus is coupled to the first switch and the first endpoint.

17. The method of claim 12, wherein the address bus comprises parallel wires for transmitting data in parallel between the start port, the first switch, the first endpoint, and the termination port,
    wherein the first value of the address bus is set by voltages simultaneously driven on the parallel wires representing respective bits of the first value of the address bus.

18. The method of claim 17, further comprising:
    determining the address range for the first port by comparing the first value of the address bus transmitted to the first endpoint using a first segment of the address bus to the incremented value generated by the first adder provided to the first switch using a second segment of the address bus,
    wherein the address range is not saved in any memory element in the first switch.

19. An integrated circuit, comprising:
    a NoC; and
    a root device;
    a switch comprising a plurality of ports;
    a plurality of endpoints coupled to the plurality of ports; and
    a data bus coupled to the root device, the switch, and the plurality of endpoints, wherein the switch is configured to forward data packets received from the root device to the plurality of endpoints using the plurality of ports and the data bus,
    wherein the integrated circuit is configured to transmit packets using the data bus to assign address ranges to the plurality of endpoints using a self-addressing technique, wherein the plurality of endpoints each comprises internal circuitry configured to implement the self-addressing technique by incrementing an address value of the data bus.

20. The integrated circuit of claim 19, further comprising:
    a NCN comprising the root device, the switch, the plurality of endpoints, and the data bus, wherein the NCN does not include a separate address bus coupled to the root device, the switch, and a plurality of configurable memories.

* * * * *